United States Patent [19]

Kohda

[11] 4,327,389
[45] Apr. 27, 1982

[54] CASSETTE TYPE TAPE RECORDER

[75] Inventor: Kazuo Kohda, Yokohama, Japan

[73] Assignee: Victor Company of Japan, Ltd., Yokohama, Japan

[21] Appl. No.: 19,125

[22] Filed: Mar. 9, 1979

[30] Foreign Application Priority Data

Mar. 10, 1978 [JP] Japan ................................. 53/27458
Mar. 10, 1978 [JP] Japan ............................ 53/30734[U]

[51] Int. Cl.³ ........................ G11B 21/22; G11B 5/54
[52] U.S. Cl. ................................... 360/105; 360/96.5
[58] Field of Search .............................. 360/105, 96.5

[56] References Cited

U.S. PATENT DOCUMENTS

| | | | |
|---|---|---|---|
| 3,719,364 | 3/1973 | Hessland et al. | 360/105 |
| 3,747,941 | 7/1973 | Van der Lely | 360/105 |
| 3,810,237 | 5/1974 | Nozawa | 360/105 |
| 3,987,486 | 10/1976 | Ito et al. | 360/105 |
| 4,040,104 | 8/1977 | Staar | 360/105 |

Primary Examiner—Robert S. Tupper
Attorney, Agent, or Firm—Haseltine and Lake

[57] ABSTRACT

A cassette type tape recorder comprises a head base movably supported on a cassette type tape recorder structure and having magnetic heads and a pinch roller provided thereon. The head base is caused to move to a position apart from the position at which a tape cassette is to be loaded by the cassette eject operation, means responsive to loading of the cassette for moving the head base toward the cassette after it has been loaded to cause the magnetic heads to make contact with a magnetic tape within the cassette, and a mechanism for holding a pinch roller and a drive roller at positions apart from a capstan and a take-up reel disc respectively, even when the head base is moved. The manual operation of switching the tape recorder to the record or play mode after the cassette has been loaded causes only the holding mechanism to move, thus pressing the pinch roller and the drive roller against the capstan and the take-up reel disc respectively. In this operation it is not necessary to move the head base so that the mode of operation of the tape recorder can be manually changed by the application of a light force.

8 Claims, 17 Drawing Figures

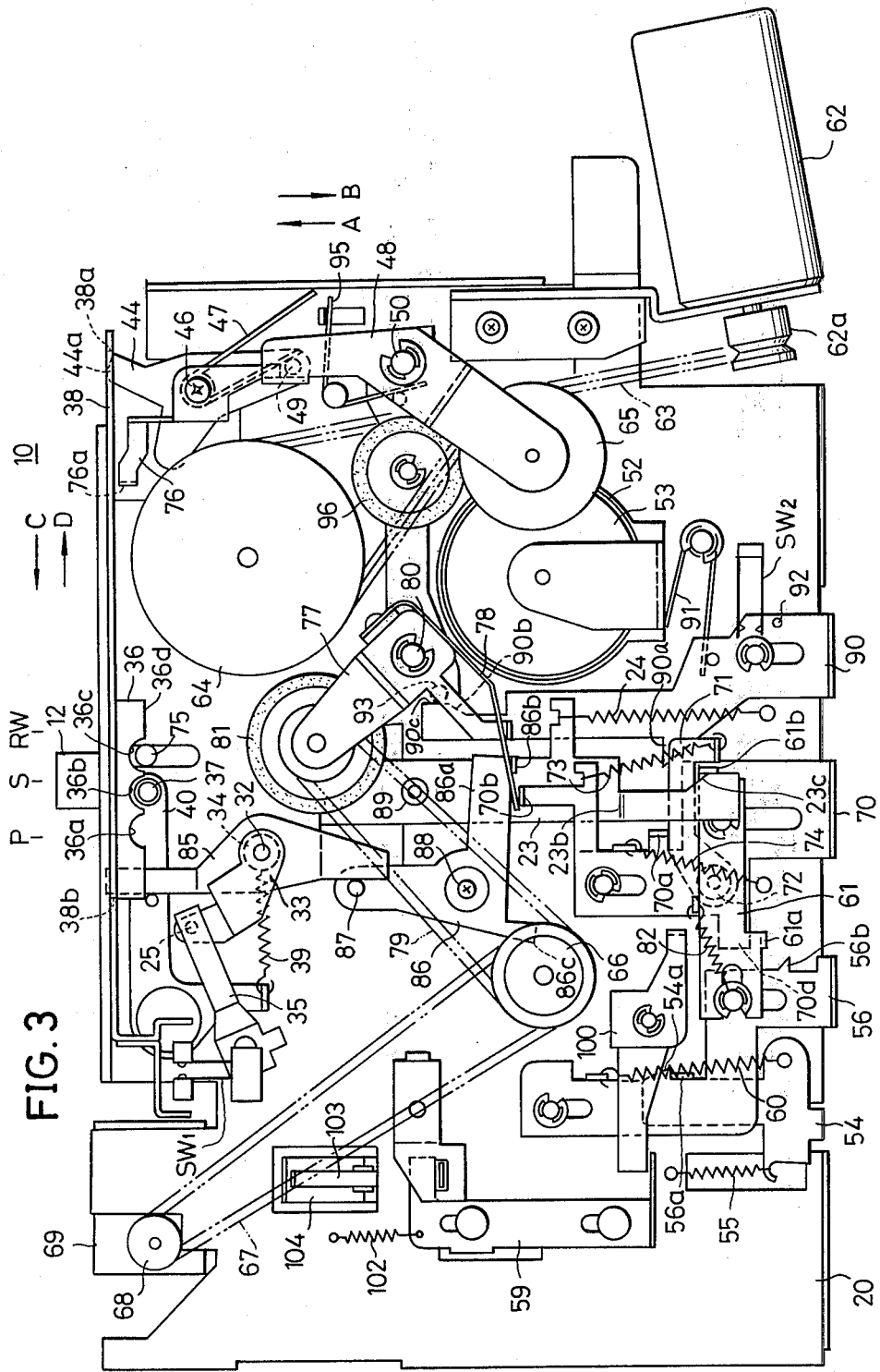

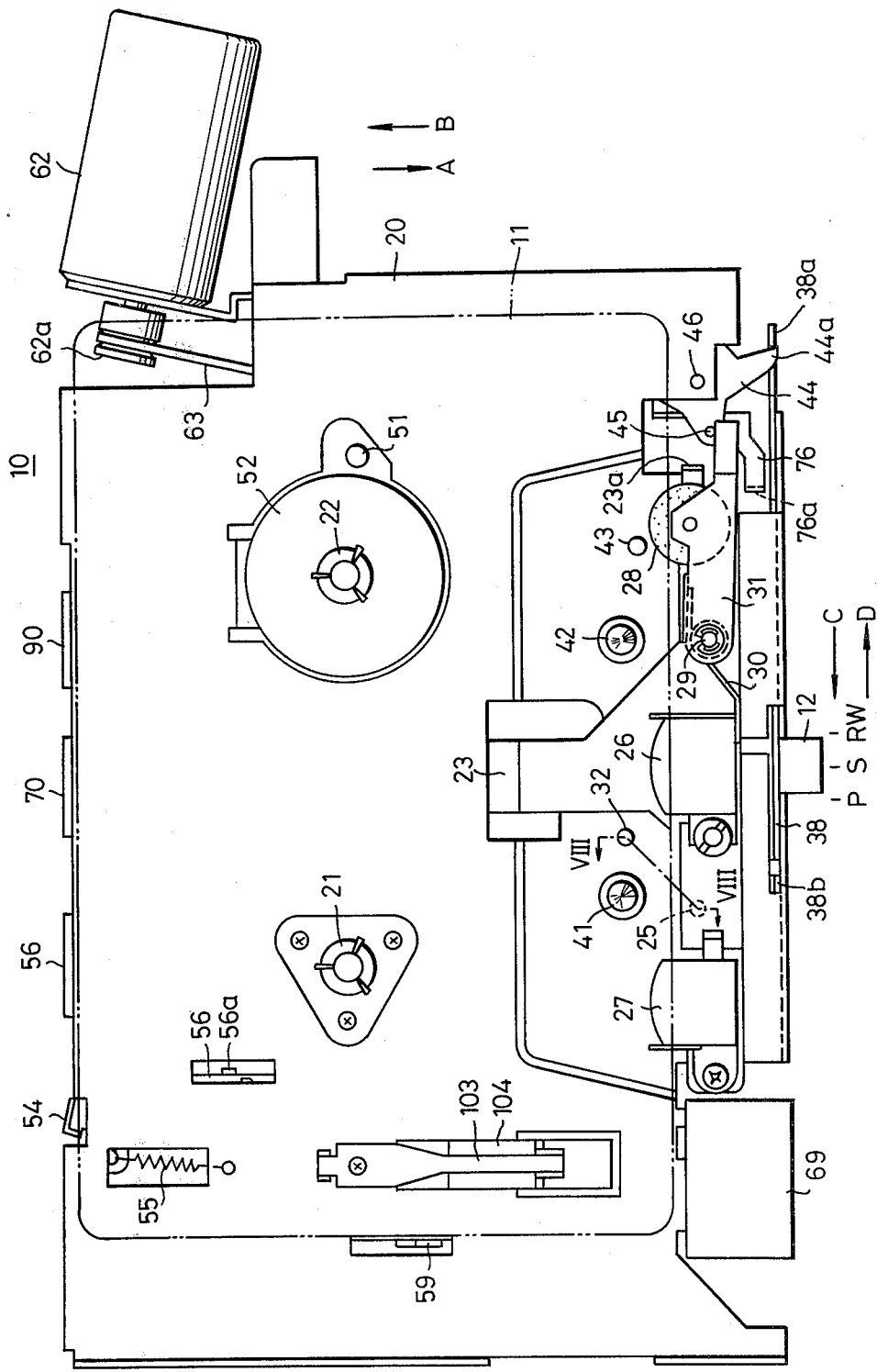

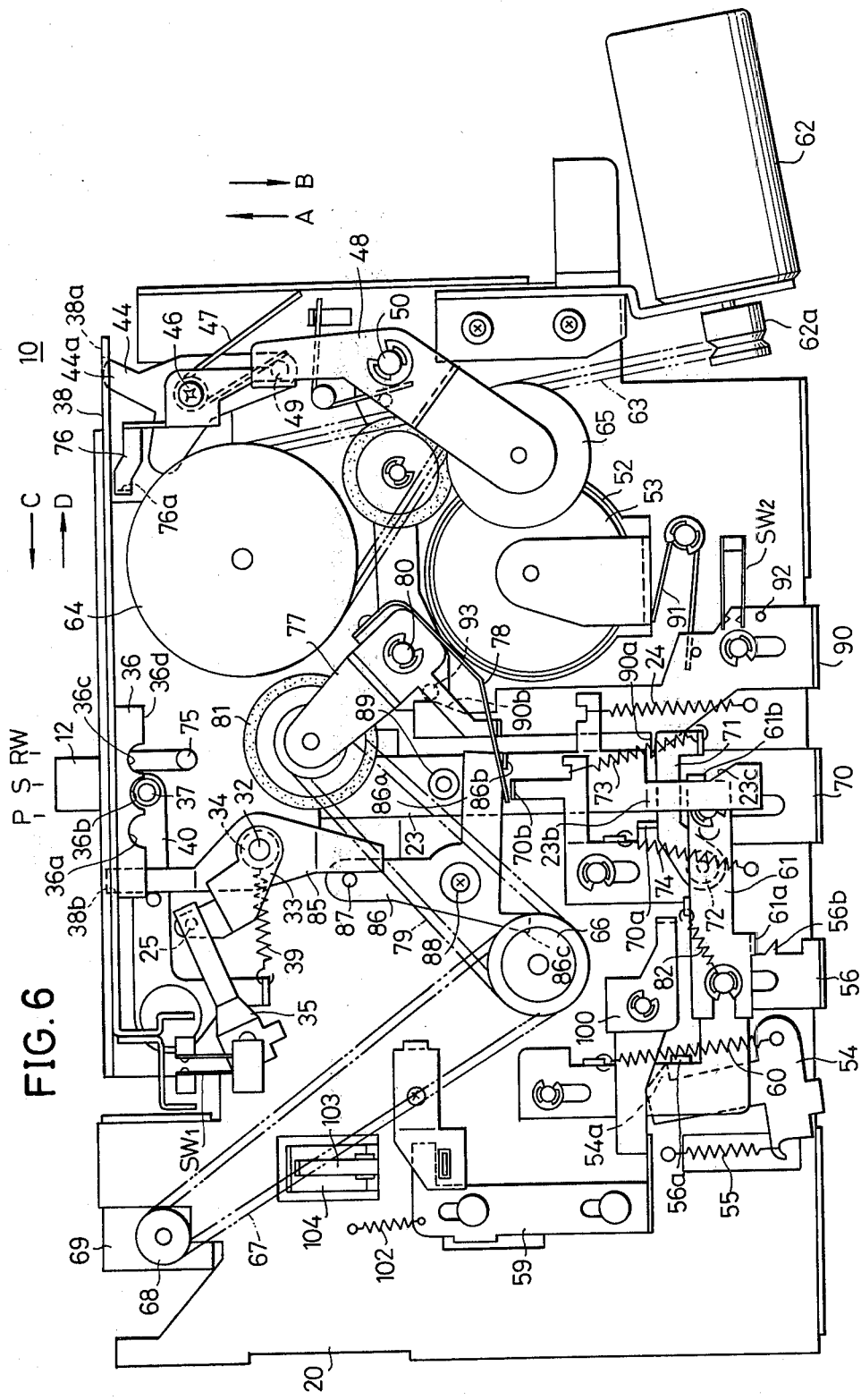

4,327,389

CASSETTE TYPE TAPE RECORDER

BACKGROUND OF THE INVENTION

The present invention relates to cassette type tape recorders in general and more particularly to a cassette type tape recorder provided with a play-and-record operation mechanism which can be operated with a light force.

When a cassette tape is to be played in a cassette type tape recorder, it is generally necessary to shift a head base from a retracted position apart from the cassette into an operating position wherein a magnetic head comes into contact with the magnetic tape within the cassette, and further, to shift a pinch roller and a drive roller into positions where they press against a capstan and a take-up reel disc respectively. In cassette type tape recorders known heretofore, the operation of putting the machine into play or record mode causes the above-described three members to shift simultaneously. Accordingly, conventional cassette type tape recorders have the disadvantage that a rather large force is required for putting the recorder into play or record mode of operation.

For miniaturization of the cassette tape recorder, it is preferable to adopt a slidable knob as the member to be hand-operated in switching the recorder in and out of the play and record operating modes. However, it is considerably more difficult for the hand to apply a large force to a slidable knob than to a push button. This is a serious problem which must be overcome in the adoption of a slidable knob.

SUMMARY OF THE INVENTION

Accordingly, it is a general object of the present invention to provide a novel and useful cassette type tape recorder which overcomes the above mentioned problem.

Another and more specific object of the present invention is to provide a cassette type tape recorder in which, in response to the loading of a tape cassette into the recorder, a head base thereby automatically advances causing shifting of the magnetic heads to their operative positions and the following manual operation putting the recorder into play or record operational mode causes a pinch roller and a drive roller to shift to their operative positions. In this tape recorder, the force required for switching into the play and record operational modes is small and, therefore, the adoption of a slidable knob as the operating member leads to no inconvenience in spite of the fact that it is difficult for the hand to apply a large force to a slidable knob.

Still another object of the present invention is to provide a cassette type tape recorder in which the movement of a single member for putting the recorder into play or record mode causes a pinch roller and a reel drive roller to shift to their operative positions. According to this tape recorder, the mechanism for operational mode change over can be effectively simplified and miniaturized.

Still another object of the present invention is to provide a cassette type tape recorder in which a mechanism for locking a head base in its retracted position is released and the head base is allowed to shift toward the cassette under spring force when the mechanism for locking is directly pressed by a loaded tape cassette. This tape recorder has a simplified structural arrangement which ensures that the magnetic heads enter into the cassette to make contact with the magnetic tape without abutting against the cassette.

A further object of the present invention is to provide a cassette type tape recorder in which a head base is retracted and a spring for advancing the head base is charged by the manual operation of ejecting the cassette from the recorder.

A still further object of the invention is to provide a cassette type tape recorder in which the manual operation of one and the same member causes the cassette to be ejected or to be made ready for removal when an operation mode selection member is in stop mode position and causes a short-period tape rewinding operation when the operation mode selection member is in the play mode position. Accordingly, a common member can be used for the cassette ejection operation and a review operation whereby miniaturization is effectively facilitated.

Additional objects and features of the present invention will become apparent from the following detailed description when read in conjunction with the accompanying drawings.

BRIEF DESCRIPTION OF THE DRAWINGS

In the drawings:

FIG. 2 and FIG. 3 are a plan view and a bottom view of one embodiment of a cassette type tape recorder in accordance with the present invention showing the mechanisms positioned above and below the chassis thereof, in their state prior to loading of a tape cassette;

FIG. 5, FIG. 6, and FIG. 7 are a plan view, a bottom view, and a side view of the cassette type tape recorder of the present embodiment with a tape cassette loaded therein;

DETAILED DESCRIPTION OF THE INVENTION

A description is first given of the arrangement and manner of operating the controls (one knob and several buttons) of a cassette type tape recorder according to the present invention.

Figure 1:
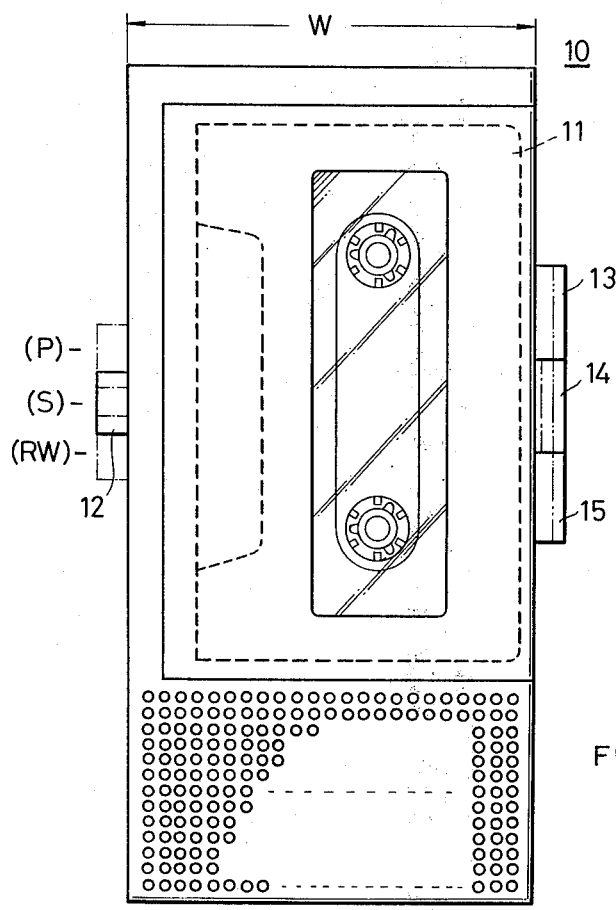
FIG. 1 is a plan view of a cassette type tape recorder according to the invention, particularly showing arrangement of the manually operated members thereof.

Referring to FIG. 1, a cassette type tape recorder 10 is adapted to be loaded with a standard type tape cassette 11 with the longitudinal direction of the cassette 11 coinciding with that of the tape recorder 10. The tape recorder 10 thus has a small width W. On one lateral surface of the tape recorder 10, there is provided a main mode selection knob 12 which is slidable and selectively set to a stop mode position (S), a play mode position (P), and a rewinding mode position (RW). On the opposite lateral surface of the tape recorder 10, there is a row of buttons comprising (from top to bottom) a record push button 13, a review push button 14 and a fast-forward push button 15. According to this arrangement, the tape recorder 10 can be held in operator's left hand, and can be easily set to any operational mode by manipulating the main mode selection knob 12 with thumb, and further by manipulating the push buttons 13, 14, and 15 with the index finger, the middle finger, and the ring finger respectively.

In recording, the record button 13 is pushed and locked in the depressed position and the knob 12 is set to position P. When the recorded sound is to be reviewed in the recording mode, the review button 14 is pushed for a desired period of time and is then released. Pushing of the button 14 frees the record button 13 from its locked state and rewinds the tape. When the button 14 is released, the tape recorder assumes the play mode, thus reproducing the recorded sound. After the recording has been reviewed, the record button 13 is again pushed to put the tape recorder back into record mode and the recording operation continues thereafter.

When the main mode selection knob 12 is set to the position P, the tape recorder assumes the play mode and when it is set to the position RW, it assumes the rewinding mode. If the fast-forward button 15 is pushed when the knob 12 is set to the position S or P, the tape recorder performs fast-forward winding and when the fast-forward button 15 is released, it is restored to its original stop mode or play mode.

Figure 2:
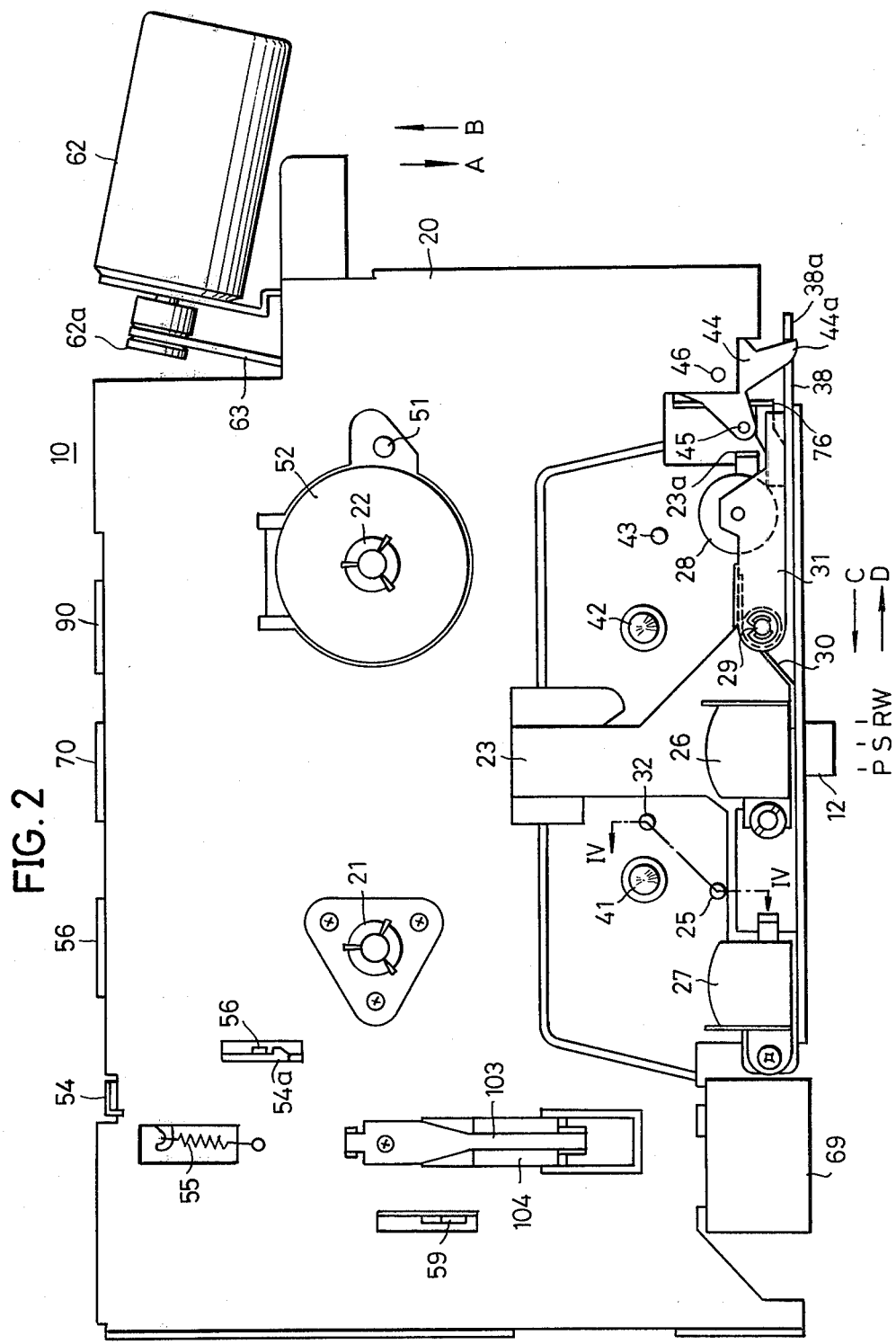

Next, the structure and operation of the tape recorder shown in FIG. 1 will be described with reference to FIG. 2 through FIG. 4.

A supply reel shaft 21 and a take-up reel shaft 22 are disposed on a chassis 20 to project above the top thereof.

A T-shaped head base 23, biased by a spring 24 in the direction of arrow B, is engaged at its lateral surface by a lock pin 25 projecting above the chassis 20 and is maintained its retracted position thereby. A recording and reproducing magnetic head 26, an erasing head 27, and a pinch roller 28 are provided on the head base 23 at positions where they will not obstruct the cassette loading operation to be described hereinafter. The pinch roller 28 is rotatably supported on an arm 31 which is rotatably supported at its one end by a shaft 29 embedded in the base 23. The arm 31 is urged to turn in the counterclockwise direction by a torsion spring 30 but is retained by engagement at its free end side with a bent part 23a of the head base 23. The heads 26 and 27 are fastened to the head base 23 by screws. Provision of the arm 31 on the head base 23 makes the tape recorder smaller than it would be if this arm were provided on the chassis 20.

Figure 4:
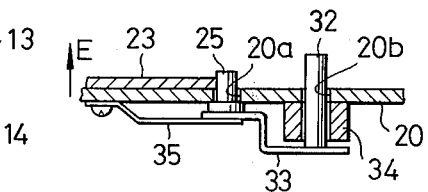
FIG. 4 is a side view, in vertical section taken along the line IV—IV in FIG. 2, showing a head base lock mechanism in its locked state.

The lock pin 25 and a cassette loading detection pin 32 are embedded in a bent plate 33, as illustrated in FIG. 4. The lock pin 25 is slidably fitted within a hole 20a formed in the chassis 20, and the detection pin 32 is similarly fitted within a chassis hole 20b and a sleeve 34 fixed to the lower surface of the chassis 20. The plate 23 is pressed upward by a leaf spring 35 screw fasted at its one end to the lower surface of the chassis 20, and the pins 25 and 32 are continuously urged in the direction indicated by arrow E. In the above mentioned mode, the pins 25 and 32 project above the chassis 20. The detection pin 32 is disposed so as not obstruct sliding movement of the head base 23 and is further adapted to be engaged with the cassette at its lower surface immediately before the cassette reaches its fully loaded position.

A cam block 36 and an enlongated control plate 38 move unitarily with the knob 12. The knob 12 can be slidably moved in either of the directions indicated by arrows C and D in a click-stop manner. The click-stops occur when a roller 37 comes to fit successively into recesses 36a, 36b and 36c in the cam block 36. The roller 37 is provided on a lever 40 which is urged to turn counterclockwise by a spring 39.

Next, the operation at the time of cassette loading will be described with reference to FIG. 5 through FIG. 8.

The cassette 11 is smoothly loaded into the proper position with its spools engaged with the reel shafts 21 and 22, its positioning holes with positioning pins 41 and 42, and its capstan receiving opening with a capstan 43. In this first stage of loading, the cassette does not abut against the magnetic heads 26 and 27.

Figure 8:
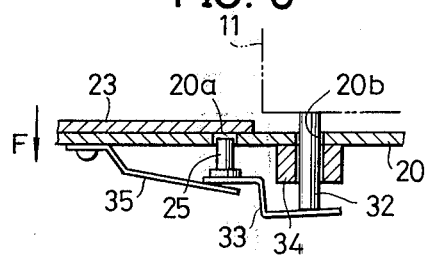
FIG. 8 is a side view, in vertical section taken along the line VIII—VIII in FIG. 5, showing the head base locking mechanism in its unlocked state.

In the second stage of loading, the cassette 11 is pushed downward so that its lower surface presses directly onto the detection pin 32 so as to unitarily push the detection pin 32 and the lock pin 25 in the direction indicated by arrow F against the force of the leaf spring 35 as illustrated in FIG. 8. When the cassette 11 is completely loaded, the lock pin 25 sinks into the hole 20a. As a result, the head base 23 is released from engagement with the lock pin 25 and is shifted in the direction indicated by arrow B by the spring 24. The distance of this shift is determined by slots and pins (neither being shown) and allows the head base 23 to reach the position illustrated in FIGS. 5 and 6.

Since, at the time when the head base 23 makes the shift described above, the cassette 11 has been already been loaded at the proper position, the magnetic heads 26 and 27 advance and enter into the cassette 11 through the front windows thereof (not shown), without abutting against the cassette 11, and make contact with the magnetic tape (not shown) of the cassette. The arm 31 is engaged, as it makes the shift together with the head base 23, with a pin 45 embedded and fixed to a rotatable control lever 44, and is forced to turn clockwise counter to the spring 30, thus separating from the bent part 23a. Accordingly, the pinch roller 28 approaches the capstan 43 and reaches a position wherein it is not pressed onto the capstan 43 but separated therefrom by only a small distance.

Accordingly, in response to the loading of the cassette 11, the tape recorder 10 assumes a state similar to the so-called "pause mode" state.

The rotatable control lever 44 has three arms and is rotatably supported on a pin 46. It is urged to turn counterclockwise in FIG. 5 and clockwise in FIG. 6 by a torsion spring 47 having a larger spring constant than the spring 30. One arm 44a of this rotatable control lever 44 is engaged with a hook 38a of the control plate 38, whereby the rotatable control lever 44 is controlled in respect of its position of rotation. In the cassette loaded mode, the rotatable control lever 44 is at a position turned clockwise in FIG. 6. Accordingly, a pin 49 on the lever 44 engages one end of an arm 48 which is thereby turned counterclockwise about a shaft 50 counter to the tension of an endless rubber belt 63. A drive roller 51 is thereby separated from an upper disc 52 as illustrated in FIG. 5.

Figure 7:
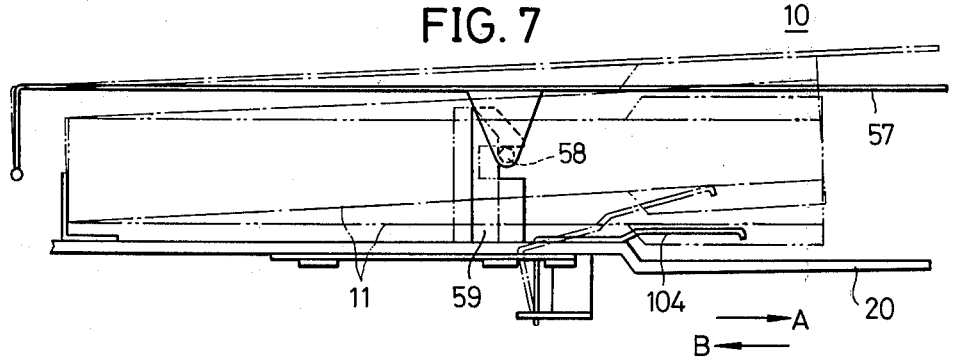

A rotatable cover 57 is closed so as to cover the cassette 11 and is maintained in this position by a pin 58 latched with a hook lever 59, as illustrated in FIG. 7.

The construction of the take-up reel disc is such that the reel shaft 22 is formed unitarily with a lower disc 53 and the upper disc 52 is mechanically linked to the lower disc 53 via a slidable friction clutch interposed therebetween. The upper disc 52 has a diameter somewhat larger than that of the lower disc 53.

Here, the cassette 11 loaded in the tape recorder is presumed to have the lugs on its rear surface. As the cassette 11 is loaded, a lever 54 for preventing inadvertent erasing is pushed by one of the lugs to rotate counter to the force of a spring 55. Accordingly hook 54a is retracted from a position confronting a bent part 56a of a record lever 56, thus allowing the lever 56 to be pushed. On the other hand, if the cassette is loaded with the lugs removed, the detection part of the lever 54 enters into the cassette and the lever 54 assumes the state indicated in FIGS. 2 and 3 so that the record lever 56 is retained by the hook 54a and cannot be pushed.

Now an explanation will be given as to how the tape recorder 10 loaded with the cassette 11 is put into the record, play, rewind, and fast-forward modes and as to how the recorder operates in each of these modes.

RECORD

Figure 9:
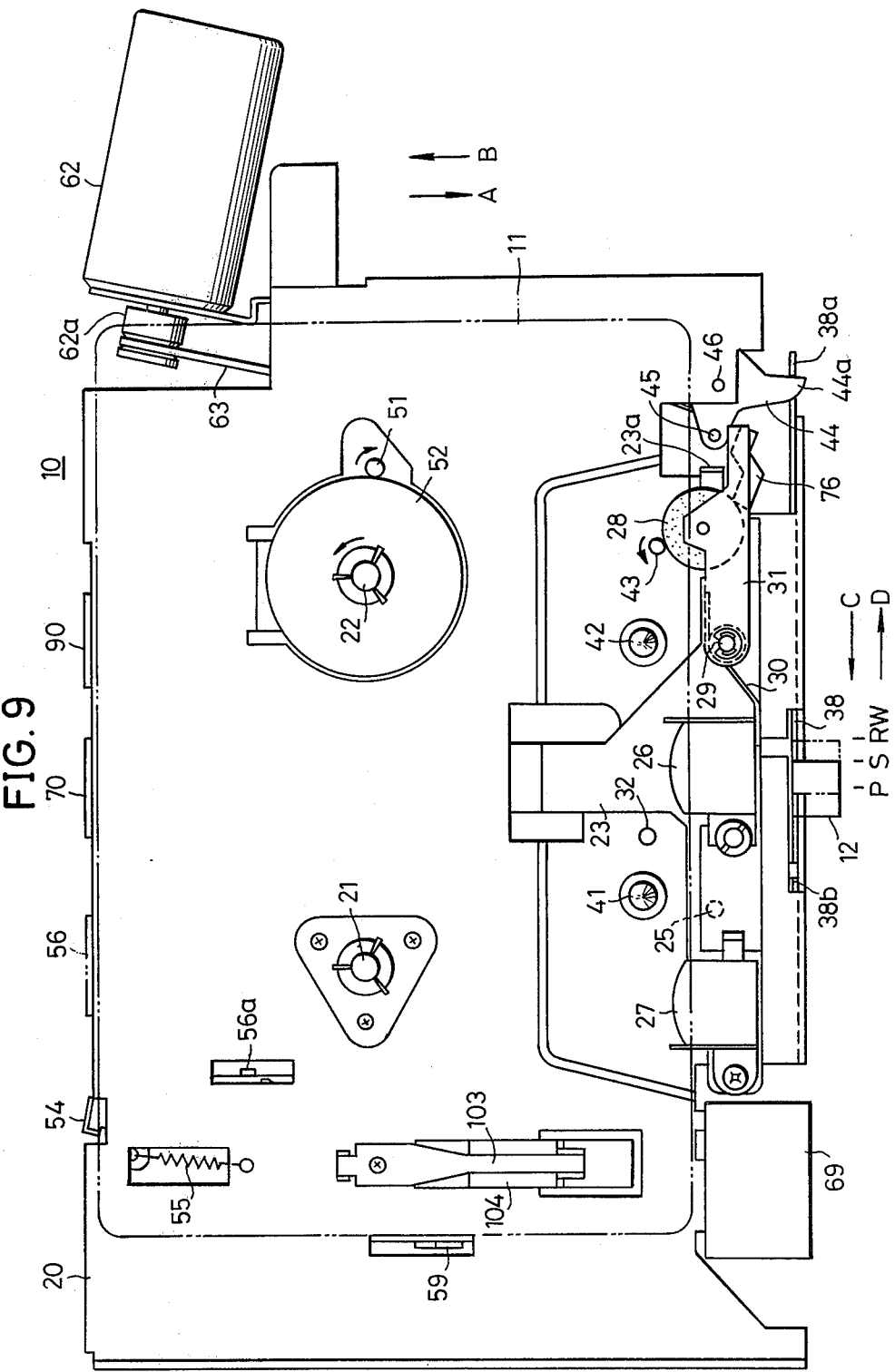
FIG. 9 and FIG. 10 are a plan view and a bottom view of the cassette type tape recorder of the present embodiment in its recording mode.
Figure 10:
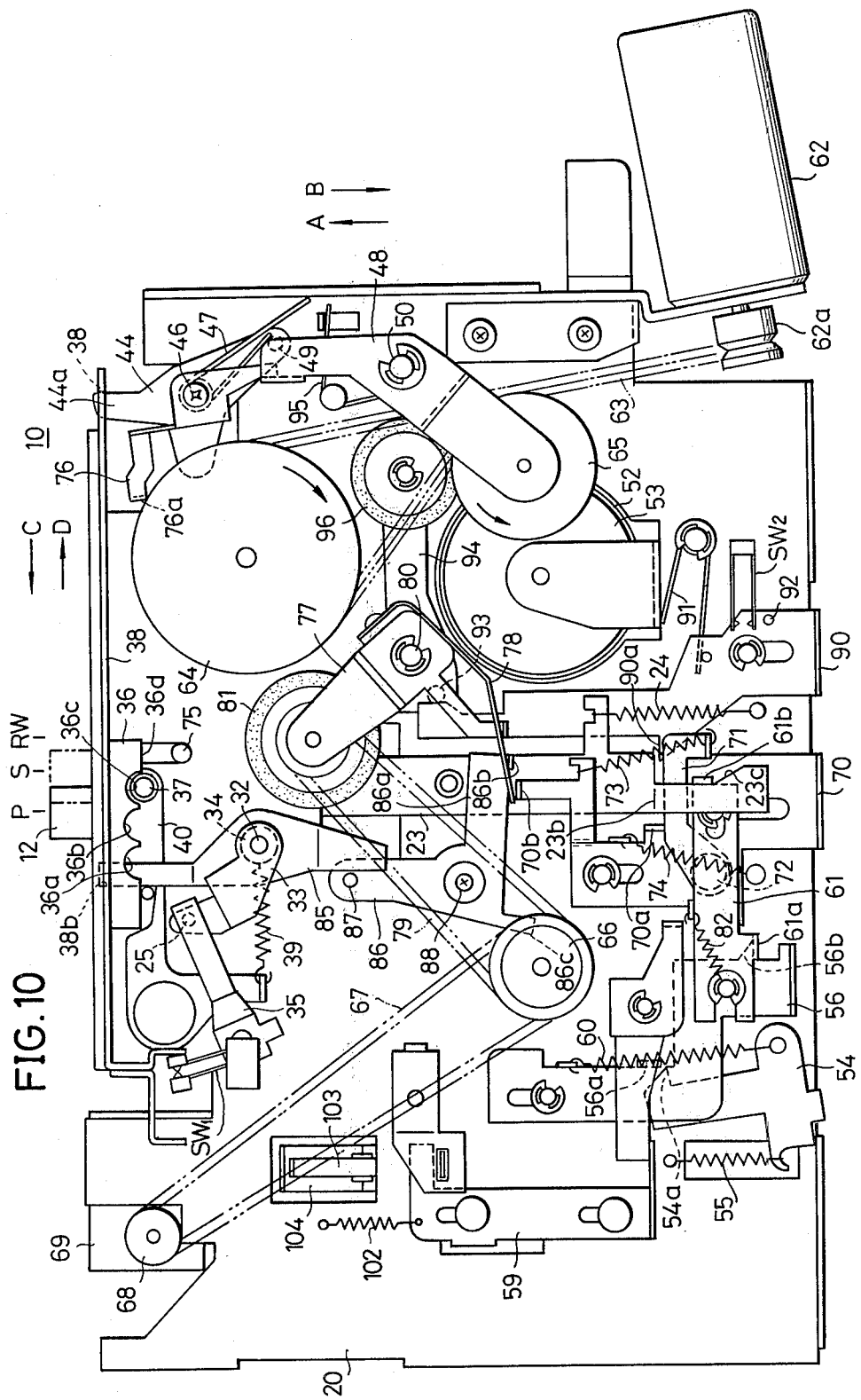

(FIG. 9 and FIG. 10)

When the tape recorder 10 is to be set to the record mode, the record lever 56 (record push button 13) is pushed and locked and the knob 12 is set to the position P.

The record lever 56 is pushed in the direction of arrow A counter to the force of a spring 60 and a lug 56b thereon comes into latched engagement with a bent part 61a formed in a slidable lock plate 61, as illustrated in FIG. 10. This operation causes a switch (not shown) to be switched over to operate a recording circuit.

The knob 12 is slid in the direction indicated by arrow C to the position P and is held in this position by the cooperative action of the roller 37 and the recess 36c. This operation causes the rotatable control lever 44 to be turned counter to the force of the spring 47 through its engagement with the hook 38a. As one result of the turning of the rotatable control lever 44, the arm 31 becomes free from engagement with the pin 45 and is allowed to be turned by the spring 30. As a result, the pinch roller 28 moves a very small distance and is pressed against the capstan 43 (more precisely against the magnetic tape interposed therebetween) by the force of the spring 30. As another result of the turning of the rotatable lever 44, the arm 48 is released from engagement by the pin 49 and is turned by the tension of the belt 63 to cause the drive roller 51 to press against the upper disc 52.

Furthermore, the movement of the control plate 38 together with the knob 12 causes a power switch SW1 to close, thus starting a motor 62. When the motor 62 is driven, a flywheel 64 is rotated at a predetermined speed in the arrow direction unitarily with the capstan 43 by way of a pulley 62a and the belt 63. Moreover, the belt 63 further rotates a pulley 65 and the drive roller 51 which is formed unitarily therewith. The reel shaft 22 is caused to rotate in the arrow direction in FIG. 9 by the drive roller 51 through a friction clutch structure (not shown).

Accordingly, a magnetic tape (not shown) in the cassette 11 is clamped between and driven by the capstan 43 and the pinch roller 28 to travel at a predetermined speed and is taken up on the take-up spool. As the tape travels, sound is recorded thereon by the magnetic head 26.

As is clear from the above description, the only member operated responsive to the manual operation of the knob 12 is the rotatable control lever 44. The head base 23 is not moved at the time of this manual operation. Accordingly, the knob 12 is only required to make the rotatable control lever 44 turn counter to the force of the spring 47 so that the knob 12 is can be manually operated smoothly and with light force. As a consequence, no difficulty is encountered in adopting a sliding-type mechanism as the main mode selection knob 12 even though it is difficult for the hand to apply a large force to such a mechanism.

Furthermore, since the moving distance of the pinch roller 28 and the drive roller 51 in response to the manual operation of the knob 12 is short, the mechanism for moving these rollers can be made correspondingly small and, moreover, the impact of the pinch roller 28 on the tape at the time it comes to press against it is slight.

The reel shaft 21 and a two-stage pulley 66 formed integrally therewith are rotated as the tape is drawn from the tape supply reel (not shown) and the rotating motion of the two-stage pulley 66 is used to operate a tape counter 69 via a belt 67 and a pulley 68.

RECORD⇌STOP

When the recording operation is to be stopped, the knob 12 is returned to the original position S. This causes the lever 44 to turn to the position indicated in FIG. 6. As the lever 44 turns, the pinch roller 28 separates by a small distance from the capstan 43 and the drive roller 51 also separates from the upper disc 52. Thus, the tape recorder is switched to a pause-mode wherein the tape travel stops and the recording operation ceases. Therefore, switch-over back and forth between the record mode and the stop mode can be carried out easily by a one-step sliding operation of the knob 12.

RECORD→REWIND→PLAY→RECORD

Figure 11:
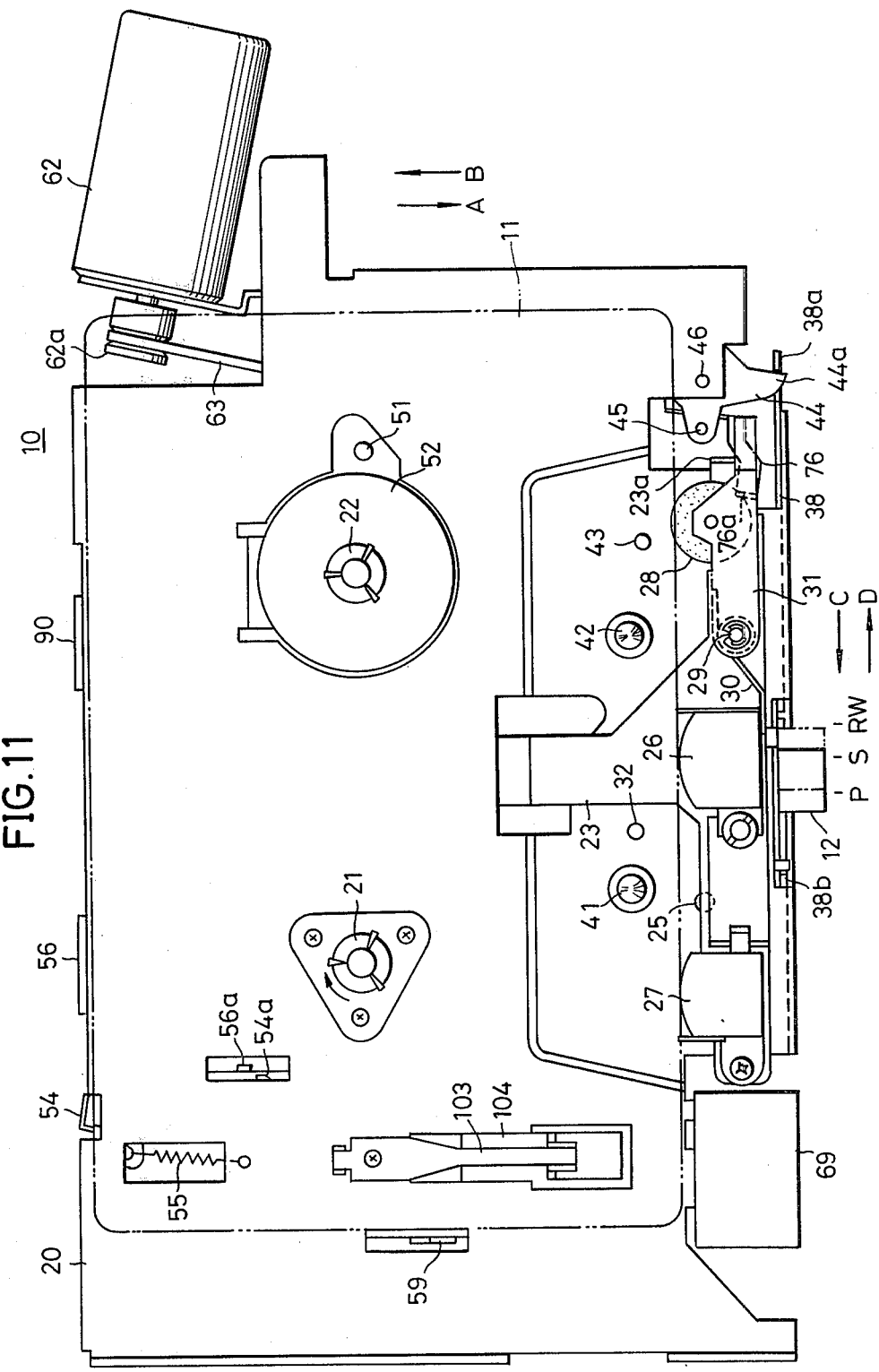
FIG. 11 and FIG. 12 are a plan view and a bottom view of the cassette type tape recorder of the present embodiment in its review mode.
Figure 12:
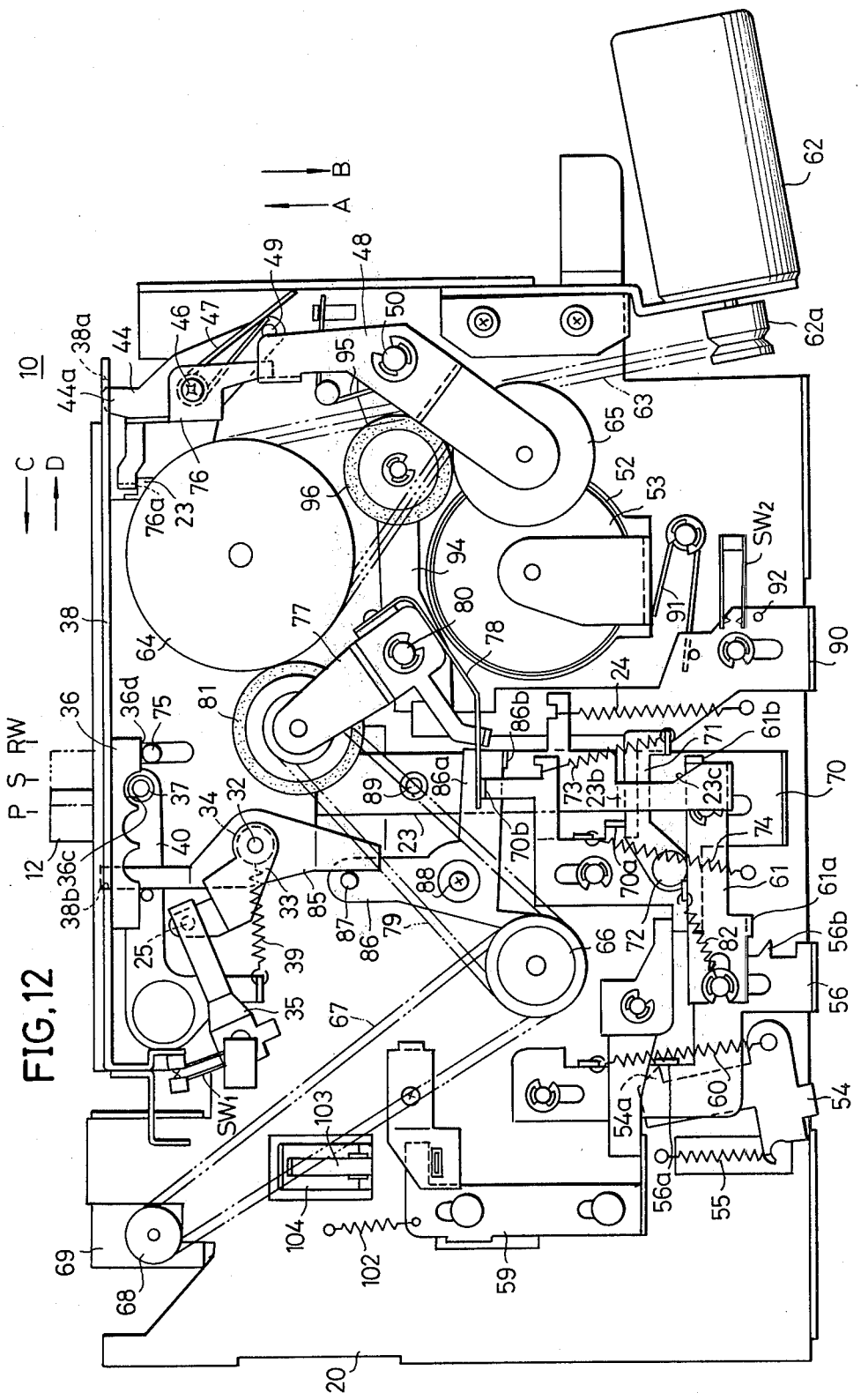

(FIG. 11 and FIG. 12)

When the recorded sound is to be reviewed in the recording mode and the recording operation is to be resumed following the review operation, an operation lever 70 (review button 14) is pushed for a desired period of time and is then released and, when recording operation is to be resumed, the record lever 56 is pressed. No operation of the main mode selection knob 12 is required.

Referring to FIG. 10, an arm 71 is pivotally supported on a pin 72 embedded in the lever 70. The arm 71 is urged to turn counterclockwise by a spring 73 stretched between itself and the lever 70 but is restricted in its rotation by engagement with a bent part 70a. The spring 73 has a spring constant which is sufficiently larger than that of the spring 24.

When the lever 70 is pushed in the direction of arrow A counter to the force of a spring 74 at the time the recorder is in the recording mode, the head base 23 is engaged at its stepped part 73b with the arm 71 and is moved in the same direction counter to the force of the spring 24. The movement of the head base 23 expands the spring 73 only a very little. The head base 23 stops at the position where a pin 75 fixedly embedded to the head base 23 abuts against a projected surface 36d of the cam block 36. As the head base 23 moves, the magnetic heads 26 and 27, and the pinch roller 28 move backwards, thus separating from the magnetic tape and the capstan 43.

Furthermore, as the head base 23 moves as mentioned above, a rotatable arm 76 is engaged at its bent part 76a with the head base 23 and is turned counterclockwise in FIG. 10 and FIG. 12. The arm 48 is engaged with the arm 76 and is turned counterclockwise thereby causing the drive roller 51 to separate from the upper disc 52. Accordingly, the tape travel in the normal direction is stopped, thereby interrupting the recording operation.

Furthermore, when the lever 70 moves as described above, its distal bent part 70b pushes one end of a leaf spring 78 the other end of which is screw fasted to a rewind arm 77. Due to the resilient force of the leaf spring 78, the arm 77 is turned clockwise about a shaft 80 counter to the tension of an endless rubber belt 79 and a rewind roller 81 is pressed against the flywheel 64. Consequently, the rotation of the flywheel 64 is transmitted by way of the roller 81 and the belt 79 to the two-stage pulley 66 and the supply reel shaft 21 is rotated in the arrow direction in FIG. 11.

Thus, the tape recorder 10 assumes the state shown in FIGS. 11 and 12, that is, a rewinding mode state wherein the magnetic tape within the cassette 11 travels at high speed in the reverse direction without contacting the heads 26 and 27.

Moreover, when the lever 70 is pushed, the lock plate 61 is guided at its bent part 61b by a slant cam 23c formed on the head base 23 to thereby slide in the direction indicated by arrow D counter to the force of a spring 82. As a result of this sliding of the lock plate 61, the lug 56b of the lever 56 is released from engagement with the bent part 61a and, by the spring 60, is automatically returned in the direction indicated by arrow B, thereby rendering the recording circuit inoperative and the reproducing circuit operative.

When the tape has been rewound as much as desired, the lever 70 is released. This causes the lever 70 and the head base 23 to move in the direction indicated by arrow B returning to their original positions under the force of the springs 24 and 74. As a result, the tape recorder 10 assumes the state indicated in FIGS. 9 and 10 (except that the record lever 56 is returned). This is the play mode to be described hereinafter and the sound recorded on the rewound portion of the tape is now reproduced.

Then, when the recording operation is to be resumed from any given position of the tape, the lever 56 is again pushed in the manner described earlier. This causes the lever 56 to be locked by the engagement of its lug 56b with the bent part 61a and causes the recording circuit to be made operative. Consequently, the tape recorder is switched to the recording mode and the continuously traveling tape is subjected to erase-and-record type recording.

As described above, erase-and-record type recording is carried out by simple operation of the levers 70 and 56, without need to operate the knob 12.

In the record mode, the lever 70 (button 14) can be pushed only halfway (to the position indicated by the two-dot chain line in FIG. 1) because of the contact of the pin 75 against the projected surface 36d of the cam block 36. This restriction on the motion of the lever 70 prevents the cassette ejecting operation described later.

PLAY (FIG. 6, FIG. 9, and FIG. 10)

The tape recorder 10 is put into the play mode by sliding the knob 12 to the position P with the lever 56 in the undepressed state as shown in FIG. 6. When the knob 12 is set to the position P, the tape driving system of the tape recorder 10 operates in a manner similar to that described in connection with the recording mode. That is, the pinch roller 28 and the drive roller 51 press against the capstan 43 and the upper disc 52, thereby causing the tape to travel in the normal direction and the sound recorded thereon to be reproduced.

When the lever 70 is depressed during play mode operation, the tape recorder is switched to the state indicated in FIGS. 11 and 12 (which has already been described) and the tape is rewound by the amount desired. When the lever 70 is released the rewound portion of the tape is reproduced again. Furthermore, in the play mode, the record lever 56 can be depressed and locked. This causes the tape recorder to switch directly from the play mode to the record mode.

Figure 13:
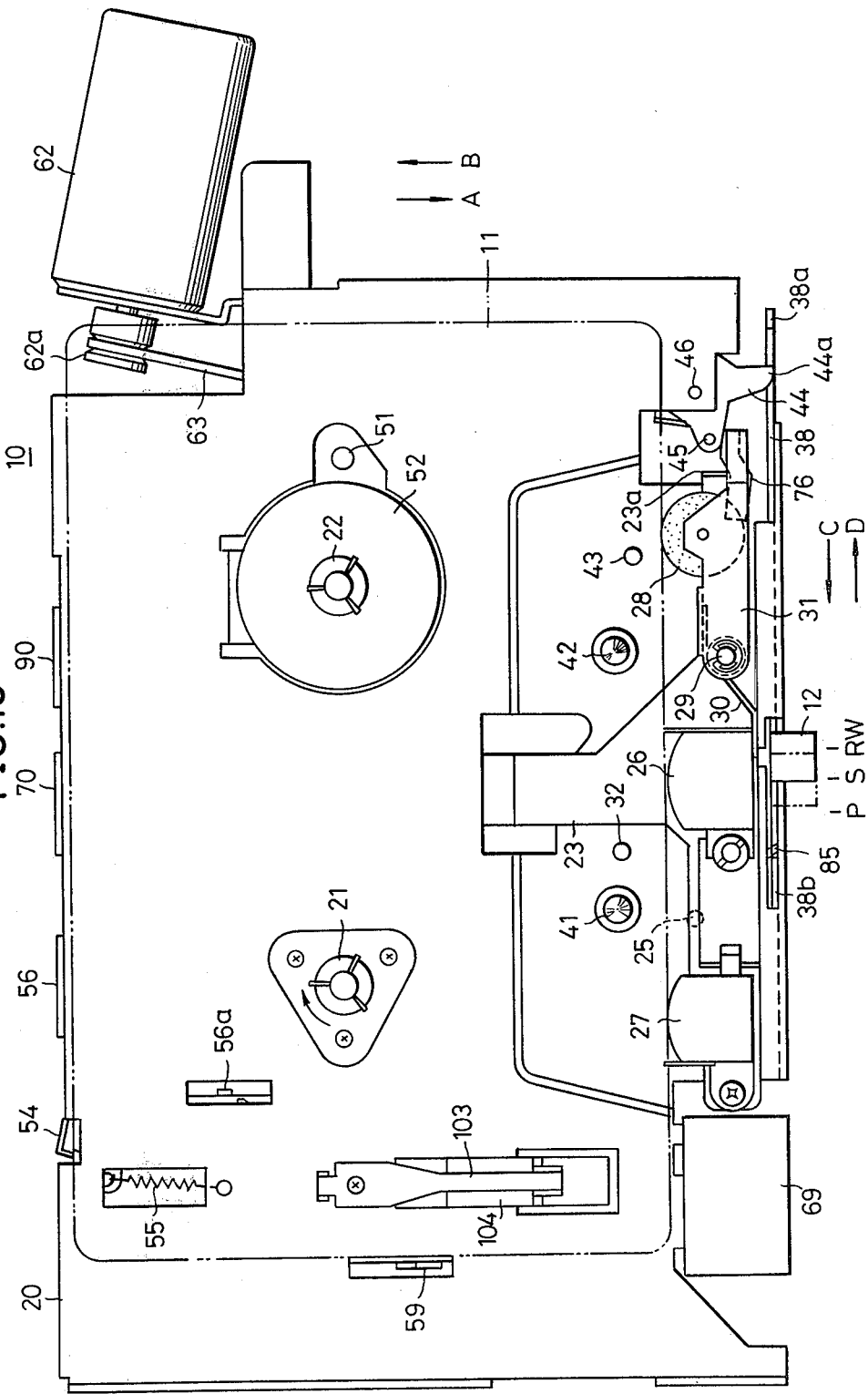
FIG. 13 and FIG. 14 are a plan view and a bottom view of the cassette type tape recorder according to the present invention in its rewinding mode.
Figure 14:
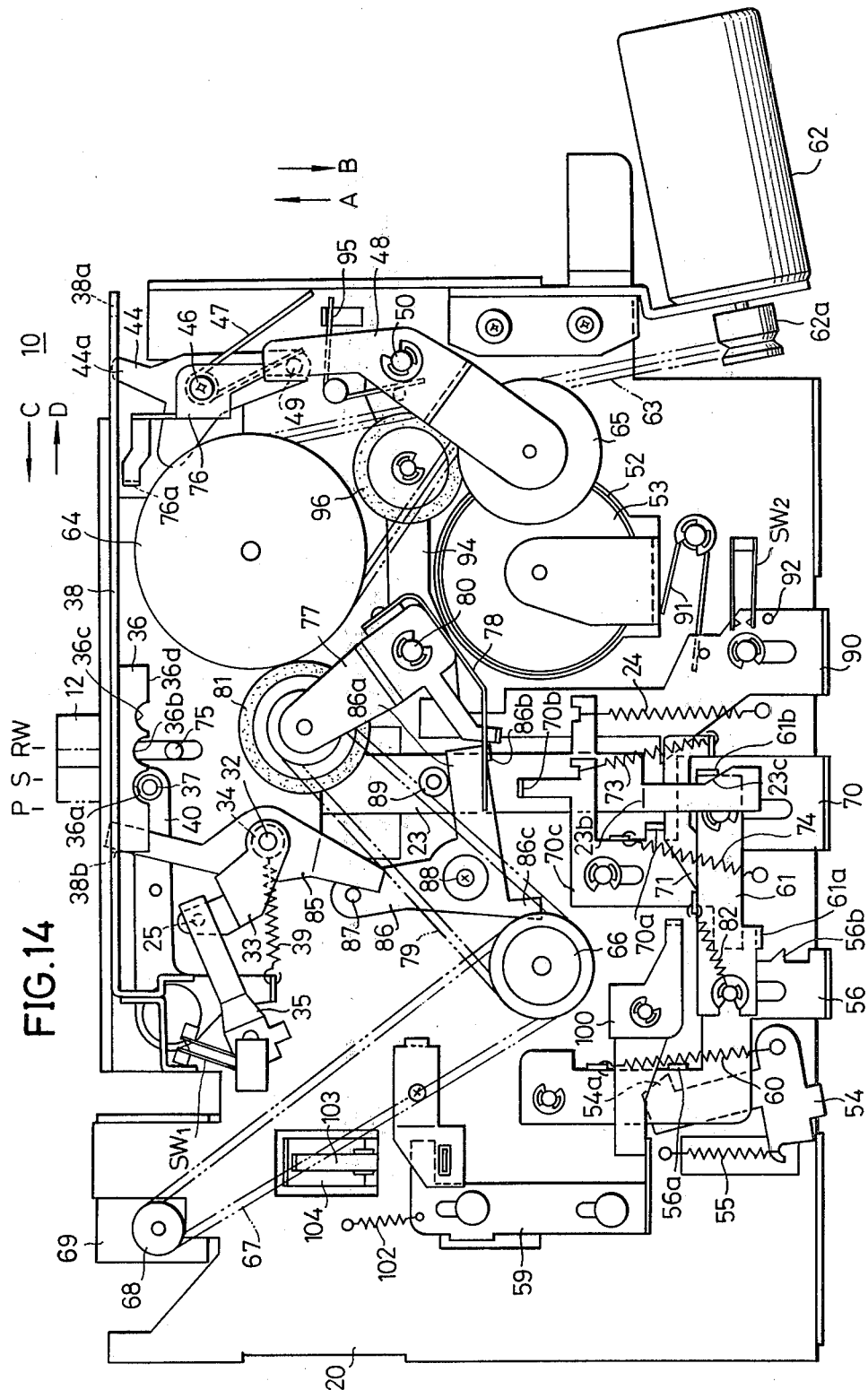

REWIND (FIG. 13 and FIG. 14)

For rewinding operation, the knob 12 is slid in the direction of arrow D to the position RW where it is held by the entry of the roller 37 into the recess 36a. The movement of the control plate 38 by the above-mentioned operation causes the switch SW1 to close and the motor 62 begins rotation. Furthermore, the shift of the control plate 38 causes a rotatable arm 85 to turn clockwise because of its engagement with a hook 38b formed in the plate 38. A pin 87 on one arm of an L-shaped arm 86 is engaged with the arm 85 and the rotating motion of the arm 85 is conveyed to the arm 86 via the pin 87 to rotate the arm 86 counterclockwise about a shaft 88.

As the arm 86 turns, an engagement arm 86a thereof engages a pin 89 embedded in the head base 23 and the head base 23 is thereby shifted counter to the force of the spring 24 in the direction indicated by arrow A up to the position illustrated in FIG. 13. Consequently, similarly to what was described in connection with the review operation, the magnetic heads 26 and 27 move back to separate from the tape and the pinch roller 28 separates from the capstan 43. The head base 23 does not retract enough to be locked by the lock pin 25.

Furthermore, the leaf spring 78 is engaged with the bent part 86b of the arm 86 and is bent thereby. The resilient force stored in the leaf spring 78 causes the arm 77 to turn clockwise. The roller 81 presses against the flywheel 64, whereby the supply reel shaft 21 is driven to turn in the tape rewinding direction indicated by the arrow in FIG. 13.

Consequently, the tape recorder 10 assumes the tape rewinding mode.

When the head base 23 shifts as described above, the lock plate 61 is guided by the slant cam 23c to slide in the direction indicated by arrow D. Therefore, when the above described operation is performed when the tape recorder is in the record mode, the record lever 56 is automatically released from locked state and is returned to its undepressed state, whereby the recorder is automatically switched out of record mode.

When the lever 70 is depressed in the rewind mode, it can be depressed only to the position where a distal end surface 70c of the lever 70 abuts against a lug 86c of the lever 86. Because of this arrangement, inadvertent ejection of the cassette 11 in the rewinding mode is positively prevented.

The mechanism may alternately be arranged in such a manner that the cam block 36 has a flat surface instead of the recess 36a, and that knob 12 may automatically return from the position RW to the position S when the knob 12 is released.

FAST-FORWARD

Figure 15:
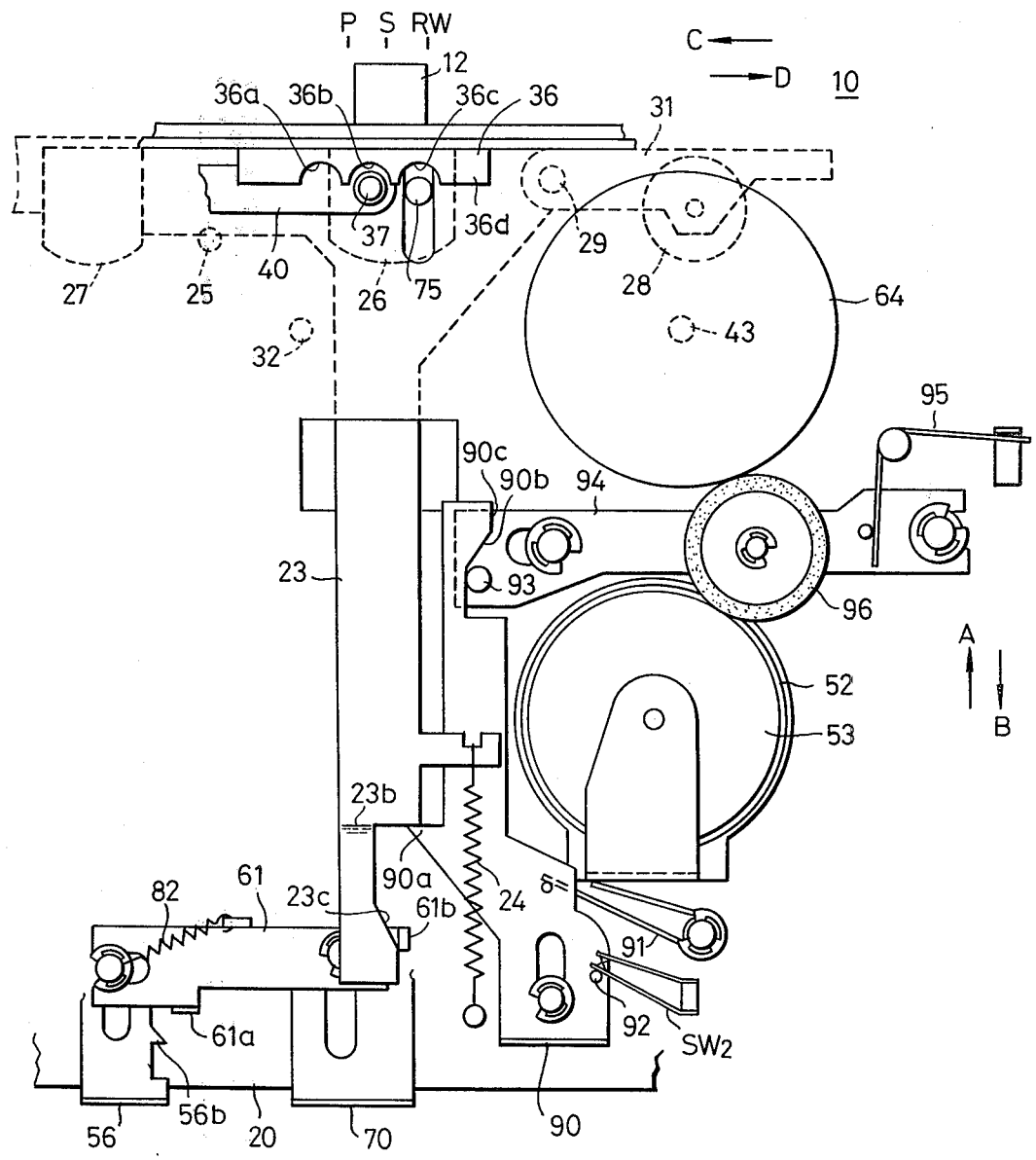
FIG. 15 is a bottom view of a principal part of the cassette type tape recorder of the present embodiment shown with the mechanism manually operated for fast-forward winding and the mode selection switch in stop mode.
Figure 16:
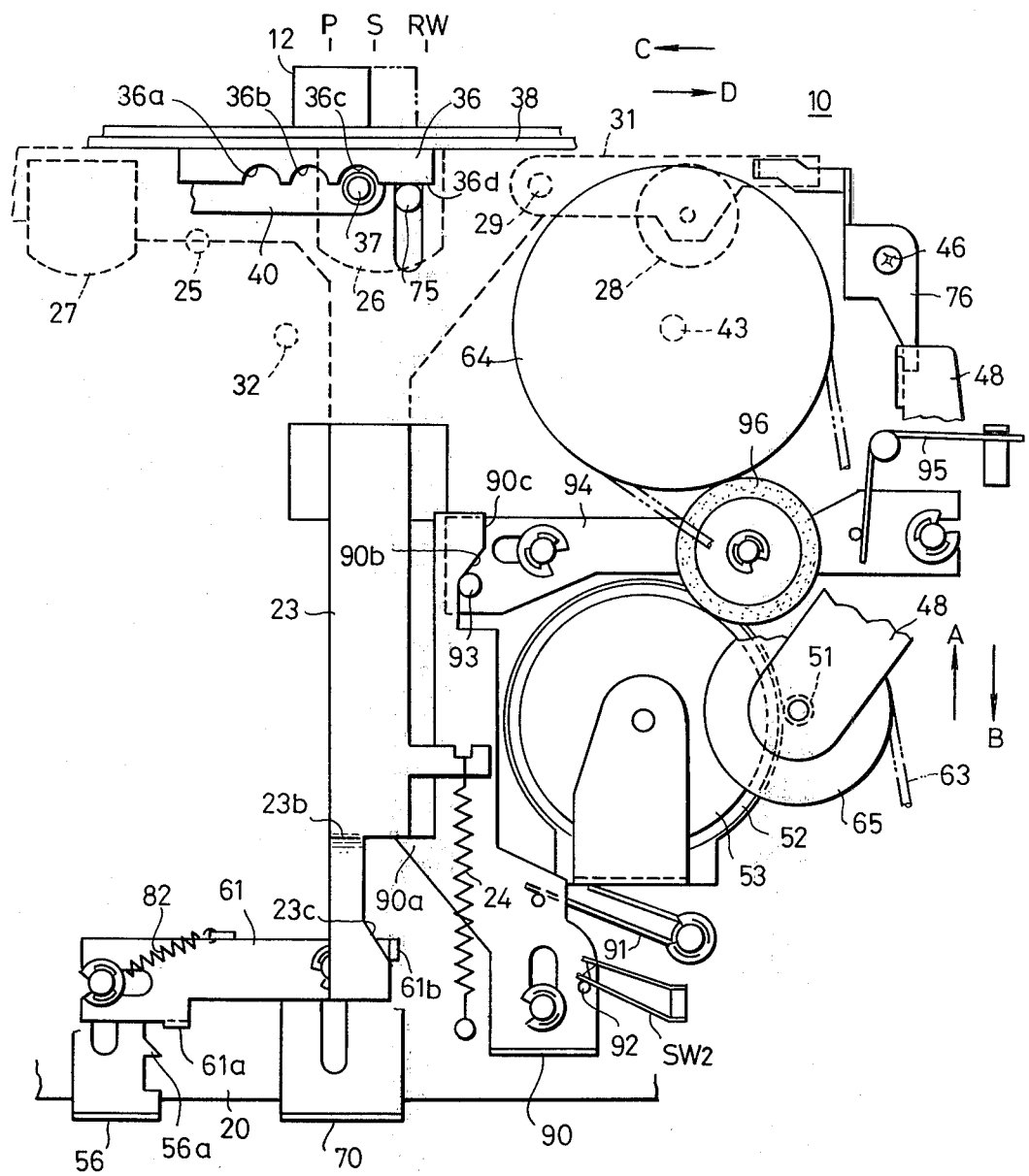
FIG. 16 is a bottom view of a principal part of the cassette type tape recorder of the present embodiment shown with the mechanism manually operated for fast-forward winding and the mode selection switch in recording mode.

(FIG. 15 and FIG. 16)

In fast-forward operation, a fast-forward lever 90 (fast-forward button 15) is pushed counter to the force of a torsion spring 91.

When the lever 90 is depressed in stop mode, the head base 23 is engaged by a lug 90a of the lever 90 and is moved in the direction indicated by arrow A counter to the force of the spring 24 and the heads 26 and 27 and the pinch roller 28 are moved backwards. The head base 23 does not move a enough to be locked by the lock pin 25. As a result of shift of the head base 23, the lock plate 61 is guided by the slant cam 23c and is shifted to its inoperative position.

Furthermore, the depression of the lever 90 causes a power switch SW2 to be engaged and closed by a pin 92, whereby the motor 62 is energized. Moreover, the depression of the lever 90 releases a pin 93 from contact with a side surface 90c at the distal end of the lever 90 thereby allowing a fast-forward plate 94 to slide in the direction indicated by arrow C under the force of a torsion spring 95. A fast-forward idler 96 rotatably supported on the plate 94 presses against both the lower disc 53 and the flywheel 64.

Consequently, the take-up reel shaft 22 is driven to rotate at a high speed in the tape winding direction, thus carrying out the tape fast-forward operation. This fast-forward operation is stopped by releasing the lever 90 and allowing it to return to its initial position under the force of the spring 24. Specifically, when the lever 90 returns, the pin 93 is guided by a slant cam 90b formed in the lever 90 to cause the plate 94 to slide in the direction indicated by arrow D counter to the force of the spring 95, whereby the idler 96 is separated from the flywheel 64 and the lower disc 53.

When the lever 90 is depressed during the play or record mode, the tape recorder 10 assumes the fast-forward mode state illustrated in FIG. 16. Here, the description of operation which is the same as that caused by depression of the lever 90 during stop mode will not be repeated.

As a result of the motion of the head base 23 in the direction indicated by arrow A, the rotatable arm 76 is engaged by a part of the head base 23 and is turned clockwise, in substantially the same manner as in the review mode described above. The rotation of the arm 76 causes the arm 48 to turn clockwise thereby separating the drive roller 51 from the upper disc 52 and cutting off the transmission of rotational force in the tape winding direction to the take-up reel shaft 22.

When the lever 90 is depressed in the record mode, the lever 56 automatically returns to its undepressed state, whereby as in the review mode described earlier, the tape recorder is switched out of the record mode.

EJECT

Figure 17:
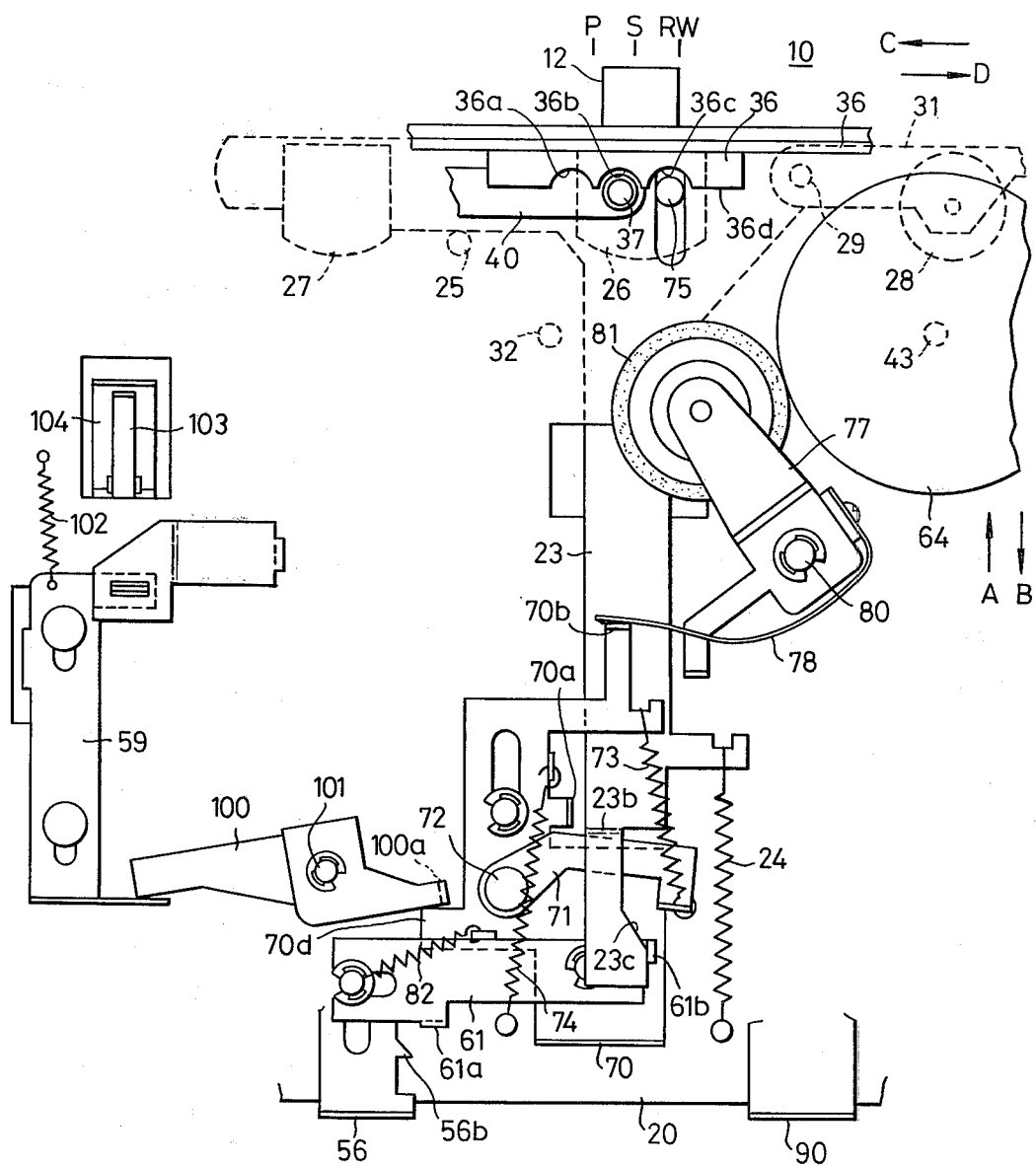
FIG. 17 is a bottom view of a principal part of the cassette type tape recorder of the present embodiment shown with the mechanism manually operated for cassette ejection.

(FIG. 7 and FIG. 17)

Ejection of the cassette is carried out by pushing the lever 70 (button 14) when the tape recorder is in the stop mode, namely when the knob 12 is set to position S.

Referring to FIG. 17, when the lever 70 is depressed counter to the force of the spring 74, the head base 23 is engaged by the arm 71 and is slid in the direction indicated by arrow A counter to the force of the spring 24. At this time, the pin 75 does not confront the projected surface 36d but confronts the recess 36c, differently from the case at the time of the above described review operation. Accordingly, as the pin 75 enters into the recess 26c, the lever 70 can be pushed further than in the case of the review operation. Consequently, the head base 23 is able to advance far enough to pass over the chassis hole 20a. That is, the head base 23 reaches a position wherein it can be locked by the lock pin 25.

The button 14 (lever 70) is further pushed counter to the force of the spring 73 up to the position indicated by the single-dot chain line in FIG. 1. This operation is accompanied by turning of the arm 71.

As a result of this depression an arm 70d of the lever 70 abuts against a bent part 100a at one end of a rotatable lever 100 thereby causing the lever 100 to turn counterclockwise about a shaft 101. This turning of the lever 100 causes the lever 59 to slide in the direction indicated by arrow B counter to the force of a spring 102, thus releasing the latching engagement between the hook lever 59 and the pin 58 on the cover 57.

Furthermore, when the lever 59 slides as described above, it engages the downwardly bent part of an L-shaped eject lever 104 and turns the eject lever 104 counter to the force of a leaf spring 103 as indicated by the two-dot chain line in FIG. 7. Consequently, the cassette 11 is engaged at its lower surface by the lever 104 and is pushed up together with the cover 57 thereby being removed from the cassette loading position, as indicated by the single-dot chain line in FIG. 7.

As the cassette 11 is removed, the lock pin 25 rises together with the detection pin 32 above the chassis 20 and operates to lock the head base 23 at the retracted position thereof. The lever 70 returns to its original position when the force manually applied thereto is released.

Furthermore, in response to the depression of the lever 70, the lock plate 61 moves to its inoperative position, similarly as in the preceding case. Furthermore, the depression of the lever 70 is accompanied by resilient deformation of the leaf spring 78, whereby the occurrence of a mechanical problem in the rewinding mechanism is precluded.

Further, this invention is not limited to these embodiments but various variations and modifications may be made without departing from the scope of the invention.

What is claimed is:

1. A cassette type tape recorder comprising:

tape driving system having a capstan and a pinch roller for cooperatively driving and advancing a magnetic tape within a tape cassette, and a take-up reel disc driven by a drive roller for taking up the advanced tape;

a head base supported on said tape recorder structure having magnetic heads mounted thereon, said pinch roller being supported on said head base;

an ejection means for removal of a previously loaded tape cassette out of said tape recorder structure when manually operated, said ejection means urging said head base to move backward to a position separated from the cassette loaded position when manually operated;

means for moving said head base forward toward said cassette in the loaded position, responsive to loading of said cassette, said magnetic head thereby coming into contact with the magnetic tape within said cassette;

retaining means for holding the pinch roller and the drive roller at positions respectively separated from the capstan and the take-up reel disc, even when said head base is moved forward;

means for storing a force for urging said pinch roller and said drive roller forward when the pinch roller and the drive roller are being held by retaining means during movement of the head base; and releasing means operable after said cassette has been loaded, for releasing the holding of said retaining means, said pinch roller and said drive roller being urged against said capstan and said take-up reel disc respectively by the force stored by said storing means.

2. A cassette type tape recorder as claimed in claim 1, wherein: said pinch roller is supported on a pinch roller arm rotatably mounted on said head base, and said retaining means holds said pinch roller, after it has moved toward said capstan responsive to cassette loading, at a position in the vicinity of said capstan.

3. A cassette type tape recorder as claimed in claim 1, wherein: said releasing means includes a knob disposed on a lateral surface of said tape recorder structure being slidable therealong.

4. A cassette type tape recorder as claimed in claim 1, which further comprises: a first support means for supporting said pinch roller and a second support means for supporting said drive roller, said first support means being provided on said head base, said second support means being provided on said tape recorder structure, and wherein: said retaining means comprises a single member operated responsive to the manual operation of said releasing means, said single member retaining the positions of the first and second support means.

5. A cassette type tape recorder as claimed in claim 1, having said means for moving said head base comprising:

a spring responsive to the manual operation of said ejection means for biasing said head base toward said cassette in the loaded position; and a head-base locking means for locking said head base at a position separated from the position where the cassette is to be loaded and to be depressed by said cassette, whereby the loading of said cassette releases said head base from its locked state.

6. A cassette type tape recorder as claimed in claim 5, having said head base locking means comprising: a pair of pin members unitarily movable in respective axial direction through a chassis;

a spring for urging said pair of pin members to project above said chassis; and a first pin member being disposed so as to be depressed directly by said cassette when loaded and a second pin member being disposed in its projected state so as to confront a front edge of said head base positioned apart from the position at which said cassette is loaded to sink below the upper surface of the chassis when said cassette is loaded.

7. A cassette type tape recorder as claimed in claim 1, wherein: said actuating means is set to a first position for causing said cassette type tape recorder to assume a stop mode and to a second position for causing said cassette type tape recorder to assume a record or play mode, and said ejection means being manually operated so as to perform the cassette ejecting operation when said actuating means is set at the first position.

8. A cassette type tape recorder as claimed in claim 7, wherein: said ejection means actuates tape rewinding means, said tape rewinding means is responsive to manipulation thereof when said actuating means is at the second position.

* * * * *